US012749939B2

(12) United States Patent
Wada et al.

(10) Patent No.: US 12,749,939 B2
(45) Date of Patent: Sep. 29, 2026

(54) ARMATURE AND DRIVING DEVICE

(71) Applicant: SUMITOMO HEAVY INDUSTRIES, LTD., Tokyo (JP)

(72) Inventors: Kotaro Wada, Yokosuka (JP); Takashi Ikeda, Yokosuka (JP); Tatsuya Yoshida, Yokosuka (JP); Daisuke Shinohira, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 322 days.

(21) Appl. No.: 18/175,545

(22) Filed: Feb. 28, 2023

(65) Prior Publication Data

US 2023/0283135 A1 Sep. 7, 2023

(30) Foreign Application Priority Data

Mar. 1, 2022 (JP) ................................ 2022-030921

(51) Int. Cl.

*H02K 3/34* (2006.01)
*H02K 3/30* (2006.01)
*H02K 41/02* (2006.01)

(52) U.S. Cl.

CPC ................ *H02K 3/34* (2013.01); *H02K 3/30* (2013.01); *H02K 41/02* (2013.01)

(58) Field of Classification Search

CPC ........ H02K 41/0352; H02K 3/30; H02K 3/34; H02K 9/19; H02K 9/22
USPC ........................................... 310/12.23, 12.29
See application file for complete search history.

(56) References Cited

U.S. PATENT DOCUMENTS

| | | | | |
|---|---|---|---|---|
| 4,865,910 A * | 9/1989 | Inoguchi | C03C 25/40 428/404 |
| 5,864,187 A * | 1/1999 | Gonzalez | H02K 41/02 310/12.29 |
| 2004/0032170 A1* | 2/2004 | Tamai | H02K 41/03 310/13 |
| 2004/0080217 A1* | 4/2004 | Ota | H02K 41/03 310/12.23 |
| 2005/0008978 A1* | 1/2005 | Dams | G03F 7/70983 430/322 |
| 2007/0252444 A1* | 11/2007 | Sadakane | H02K 41/031 310/12.21 |
| 2013/0257182 A1* | 10/2013 | Shinohira | H02K 9/227 310/12.29 |
| 2014/0132088 A1* | 5/2014 | Morel | H02K 41/03 310/12.22 |

(Continued)

FOREIGN PATENT DOCUMENTS

| | | |
|---|---|---|
| JP | H5-57558 A | 3/1993 |
| JP | 2001327152 A * | 11/2001 |

(Continued)

OTHER PUBLICATIONS

Machine Translation of JP 2001327152A (Year: 2001).*

(Continued)

*Primary Examiner* — Christopher M Koehler
(74) *Attorney, Agent, or Firm* — WTA IP Law P.C.

(57) ABSTRACT

Provided is an armature including a plurality of coils that generate power according to a flowing current, and a covering member that covers the plurality of coils from an outside, insulates the plurality of coils from each other, and reduces outgas to the outside.

4 Claims, 11 Drawing Sheets

(56) References Cited

U.S. PATENT DOCUMENTS

| | | | | |
|---|---|---|---|---|
| 2015/0162812 | A1 | 6/2015 | Da Conceiçao Rosa | |
| 2015/0280539 | A1* | 10/2015 | Kollen .................. | B23K 31/02 164/76.1 |

FOREIGN PATENT DOCUMENTS

| | | | | |
|---|---|---|---|---|
| JP | 2006034042 | A | * | 2/2006 |
| JP | 2008072817 | A | * | 3/2008 |
| JP | 2008237005 | A | * | 10/2008 |
| JP | 2013-038964 | A | | 2/2013 |
| JP | 2021-164193 | A | | 10/2021 |
| WO | WO 2017/169908 | A1 | | 10/2017 |

OTHER PUBLICATIONS

Machine Translation of JP 2006034042A (Year: 2006).*
Machine Translation of JP 2008072817A (Year: 2008).*
Machine Translation of JP 2008237005A (Year: 2008).*
Office Action of the corresponding CN Application No. 202310173420.9 Mailed on May 29, 2026.

* cited by examiner

ARMATURE AND DRIVING DEVICE

CROSS-REFERENCE TO RELATED APPLICATIONS

This application claims priority to Japanese Patent Application No. 2022-030921, filed on Mar. 1, 2022, which is incorporated by reference herein in its entirety.

BACKGROUND

Technical Field

Certain embodiments of the present invention relate to an armature and a driving device suitable for use in a vacuum environment.

Description of Related Art

The related art discloses an armature of a linear motor including coil arrays on both sides of a plate-shaped cooling unit. Further, the related art discloses a driving device that drives a stage in an X-axis direction and a Y-axis direction that are perpendicular to each other by a linear motor.

SUMMARY

According to an embodiment of the present invention, there is provided an armature including: a plurality of coils that generate power according to a flowing current; and a covering member that covers the plurality of coils from an outside, insulates the plurality of coils from each other, and reduces outgas to the outside.

Another aspect of the present invention is a driving device. This device includes a plurality of coils that generate power according to a flowing current; a covering member that covers the plurality of coils from an outside, insulates the plurality of coils from each other, and reduces outgas to the outside, and a vacuum chamber that accommodates the plurality of coils and the covering member inside the vacuum chamber in a vacuum state.

DETAILED DESCRIPTION

Figure 1:
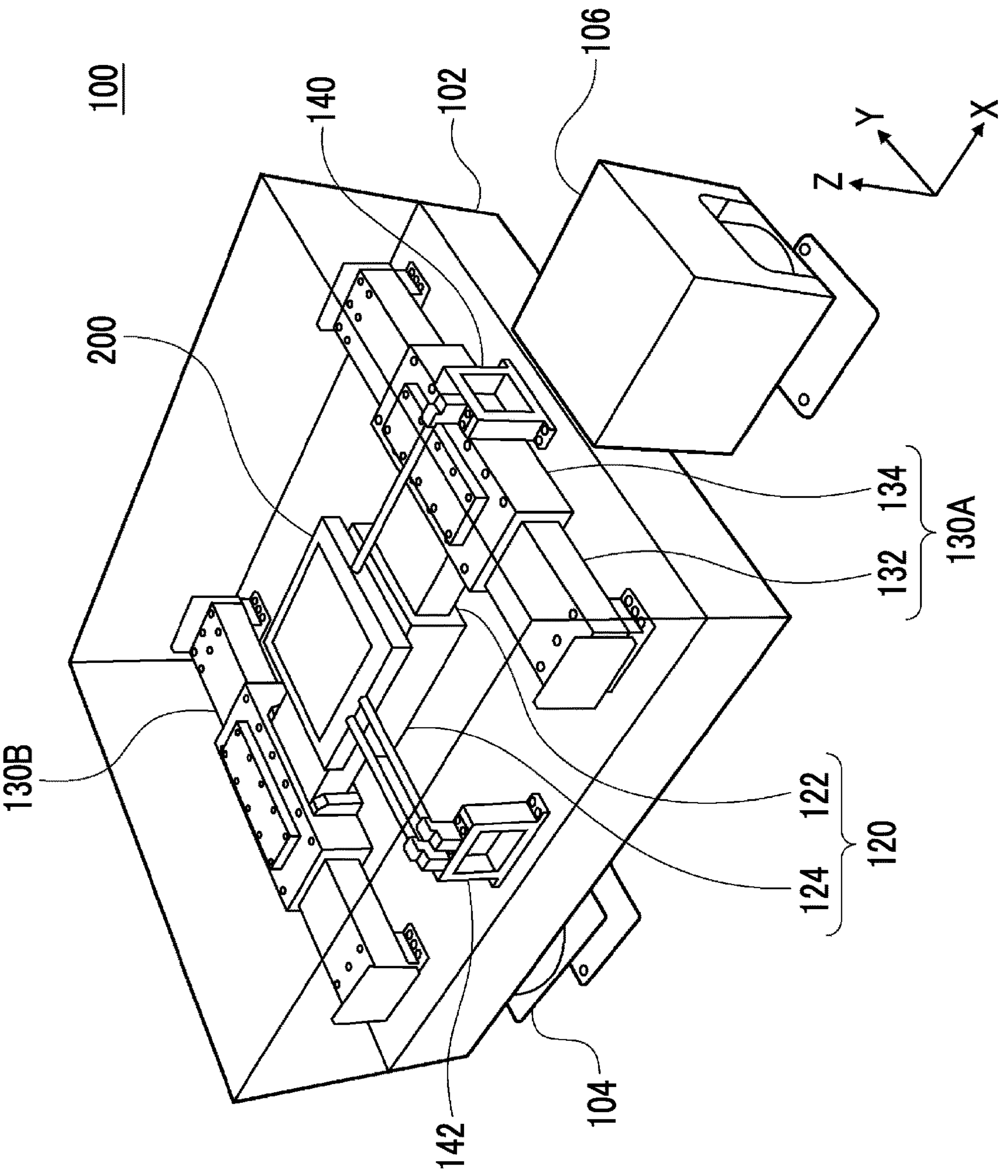
FIG. 1 is a perspective view schematically showing a stage driving device.

When the above linear motor or driving device is applied to an apparatus such as a semiconductor manufacturing apparatus that performs fine processes in a vacuum environment, outgas from the insulation coating for preventing a short circuit of the coil itself and between adjacent coils can cause pollution or contamination of the vacuum environment in the vacuum chamber. In such a case, it is necessary to perform immediate shutdown of an apparatus, bulk disposal of semiconductor wafers in process, and labor and time consuming re-setup of the vacuum environment of the vacuum chamber, which causes a huge economic loss.

It is desirable to provide an armature suitable for use in a vacuum environment.

In this aspect, since outgas from the covering member itself or a coil covered with the covering member is reduced, pollution or contamination due to outgas when used in a vacuum environment can be effectively prevented.

Any combination of the above components and conversion of the expression of the present invention between methods, devices, systems, recording media, computer programs, and the like are also effective as aspects of the present invention.

Hereinafter, embodiments for carrying out the present invention will be described in detail with reference to the accompanying drawings. In the description or drawings, the same or equivalent components, members, and processes are designated by the same reference numerals, and duplicate description thereof will be omitted. The scale and shape of shown each portion is set for convenience in order to facilitate the description, and is not limitedly interpreted unless otherwise specified. The embodiments are examples, and the scope of the present invention is not limited in any way. All the features and combinations thereof described in the embodiments are not always essential to the invention.

FIG. 1 is a perspective view schematically showing a stage driving device 100 as a driving device to which an armature and a motor according to the present invention can be applied. The stage driving device 100 includes a platen 102, a vibration isolation table 104 that supports the platen 102 from below, a vibration isolator 106, a table 200 as a driven body on which an object to be processed such as a semiconductor wafer is placed, one X-axis actuator 120 extending along the X-axis, and two Y-axis actuators 130A and 130B extending along the Y-axis (hereinafter, collectively referred to as Y-axis actuators 130). The X-axis actuator 120 and the Y-axis actuators 130A and 130B form an H shape when viewed from above. The vibration isolator 106 absorbs the force caused by the operations of the X-axis actuator 120 and the Y-axis actuators 130A and 130B and the vibration from the floor to reduce the vibration of the platen 102.

Of the configurations of the stage driving device 100, at least the table 200, the X-axis actuator 120, and the Y-axis actuator 130 are accommodated in a vacuum chamber whose inside is kept in a vacuum state. In the present specification, the term "vacuum" represents a state of a space filled with a gas having a pressure lower than the normal atmospheric pressure. Vacuum is categorized into low vacuum (100 kPa to 100 Pa), medium vacuum (100 Pa to 0.1 Pa), high vacuum (0.1 Pa to $10^{-5}$ Pa), ultra-high vacuum ($10^{-5}$ Pa to $10^{-8}$ Pa), extremely high vacuum ($10^{-8}$ Pa or less), or the like, depending on the pressure range. The stage driving device 100 of the present embodiment may be used in a vacuum environment of any of the above categories. However, according to the linear motor described later, pollution or contamination of the vacuum environment due to outgas can be effectively prevented, so that the present embodiment is suitable for a stage driving device 100 that operates in a vacuum environment of a low pressure range (for example, a pressure range of high vacuum or lower) in which a vacuum chamber is required to have a high degree of cleanliness.

The X-axis actuator 120 and the Y-axis actuators 130A and 130B are respectively provided with a linear motor to be described later. The linear power in an X-axis direction or a Y-axis direction generated by each linear motor linearly drives the table 200 serving as a driven body in the X-axis direction or the Y-axis direction. The X-axis actuator 120 includes a square shaft or an X-axis guide 122 extending in the X-axis direction, and an X-axis slider 124 that is movable in the X-axis direction along the X-axis guide 122. Similarly, the Y-axis actuator 130 includes a square shaft or a Y-axis guide 132 extending in the Y-axis direction, and a Y-axis slider 134 that is movable in the Y-axis direction along the Y-axis guide 132. By supplying gas such as pressurized air between the outer peripheral surface of the X-axis guide 122 and the inner peripheral surface of the X-axis slider 124, the X-axis slider 124 floated from the X-axis guide 122 may move smoothly and precisely with extremely low friction. At this time, to prevent the supplied pressurized air or the like from leaking into the vacuum environment in the vacuum chamber, an exhaust port or exhaust groove connected to an exhaust device such as a vacuum pump that exhausts the pressurized air or the like is preferably provided between the outer peripheral surface of the X-axis guide 122 and the inner peripheral surface of the X-axis slider 124. Similarly, these gas supply portions and exhaust portions may be provided between the outer peripheral surface of the Y-axis guide 132 and the inner peripheral surface of the Y-axis slider 134.

Both end portions of the X-axis guide 122 are fixed to the Y-axis sliders 134 of the Y-axis actuators 130A and 130B. When the linear motors in the Y-axis actuators 130A and 130B drive the Y-axis slider 134 in the Y-axis direction in synchronization with each other, the X-axis actuator 120 moves in the Y-axis direction together with the X-axis guide 122 fixed to the Y-axis slider 134. Since the table 200 is fixed to the X-axis slider 124 of the X-axis actuator 120, the table 200 as a driven body is driven in the Y-axis direction by the linear motor of the Y-axis actuator 130. Further, the linear motor of the X-axis actuator 120 drives the X-axis slider 124 together with the table 200 in the X-axis direction. In this way, the stage driving device 100 drives the table 200 as a driven body in the XY plane, by the linear motors of the X-axis actuator 120 and the Y-axis actuator 130.

A position sensor 140 measures the position of the table 200 in the X-axis direction, and a position sensor 142 measures the position of the table 200 in the Y-axis direction. By differentiating the measured positions in the X-axis direction and the Y-axis direction with respect to time, the velocities in the X-axis direction and the Y-axis direction are obtained. Further, by differentiating the velocities in the X-axis direction and the Y-axis direction with respect to time, accelerations in the X-axis direction and the Y-axis direction are obtained. The table 200 as a driven body is driven with high accuracy by the feedback-control based on the measurement data of the position, the velocity, and the acceleration.

For example, in the semiconductor manufacturing apparatus such as an exposure apparatus, an ion implanter, a heat treatment apparatus, an asking apparatus, a sputtering apparatus, a dicing apparatus, an inspection apparatus, and a cleaning apparatus or a flat panel display (FPD) manufacturing apparatus, the stage driving device 100 of the present embodiment, which can realize high-precision driving under the vacuum environment as described above, is suitable for applications in which the table 200 on which a semiconductor wafer or the like to be processed is placed is used as a driven body.

Figure 2:
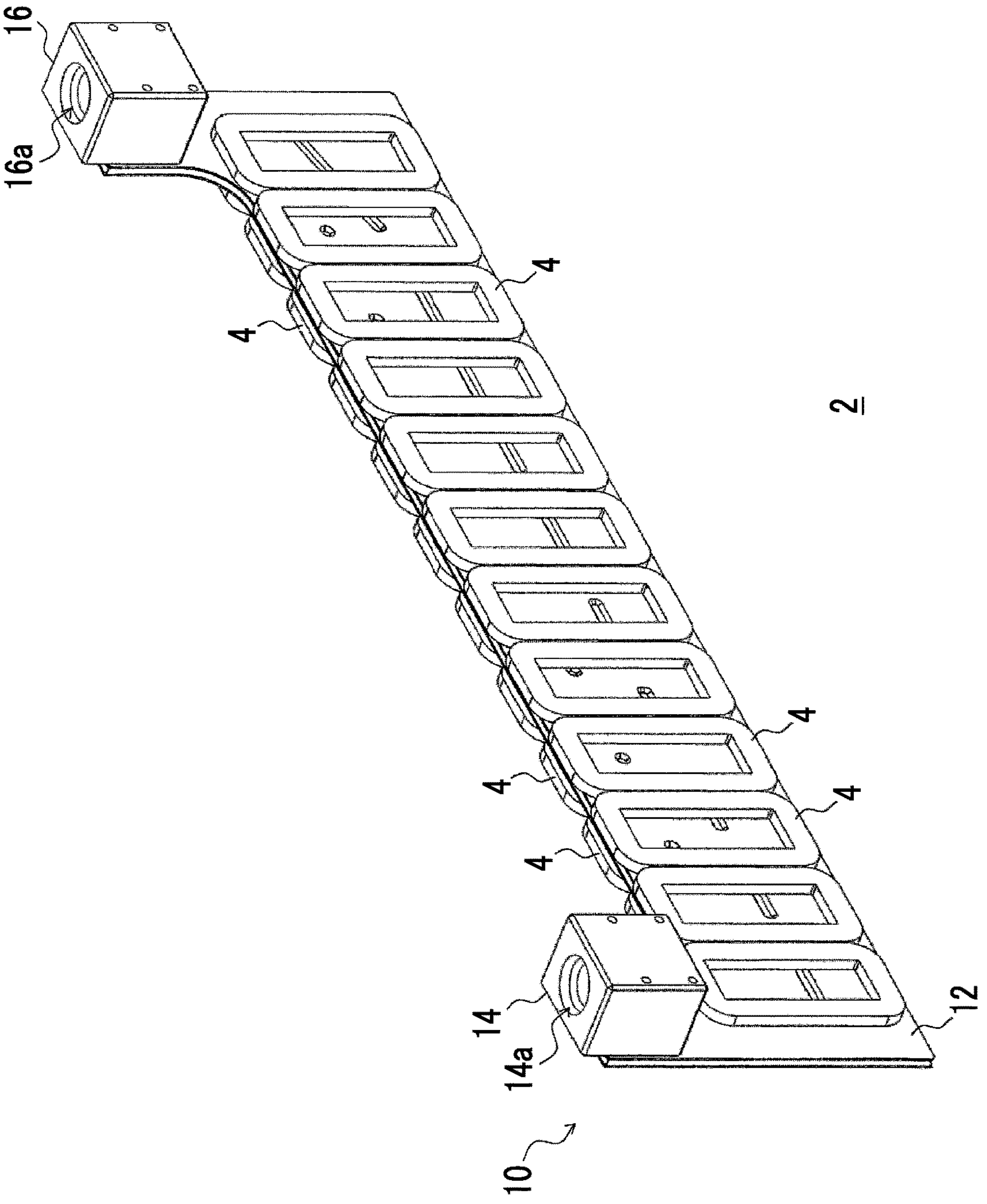
FIG. 2 is a perspective view showing a linear motor.

FIG. 2 is a perspective view showing an armature of a linear motor provided in each of the X-axis actuator 120 and the Y-axis actuator 130. The linear motor includes a field magnet (not shown) composed of a permanent magnet or an electromagnet, and an armature 2 composed of a plurality of coils 4 or the electromagnet. The armature 2 (or a cooling unit 10 to be described later) has a long substantially rectangular plate shape, and a coil array composed of a plurality of the coils 4 is formed on both the first surface side and the second surface side thereof. Each coil array includes a plurality of coils 4 arranged at substantially equal intervals without a gap along a longitudinal direction (a substantially left-right direction in FIG. 2) of the armature 2 (or a cooling unit 10 to be described later). In the example of FIG. 2, each coil array includes 12 coils 4. Therefore, when a three-phase alternating current is applied to each coil array, the 12 coils 4 are divided into four sets of three-phase coils.

A linear power generated by a magnetic field generated by each coil array in which a drive current such as a three-phase alternating current has flowed is exerted on field magnets (not shown) with permanent magnets or electromagnets facing each coil array and/or each coil array itself. The direction of this linear power is substantially the same as the arrangement direction of each coil array (that is, the longitudinal direction of the armature 2 or the substantially left-right direction in FIG. 2), and the field magnet and the armature 2 relatively linearly move in that direction. Any of the field magnet and the armature 2 may be used as a mover and a stator. That is, the field magnet may be used as a mover and the armature 2 may be used as a stator, or the field magnet may be used as a stator and the armature 2 may be used as a mover, or both the field magnet and the armature 2 may be used as a mover.

Further, the field magnets on both sides may be integrally driven by the coil arrays on both sides of the armature 2 by connecting or integrally forming the field magnets respectively facing the coil arrays on the first surface side and the second surface side of the armature 2. In this case, substantially the same drive current is applied to each coil 4 on the first surface side of the armature 2 and each coil 4 on the second surface side located behind the first surface. Alternatively, the field magnet on the first surface side and the field magnet on the second surface side may be driven independently of each other, by applying different drive currents to the coil arrays on the first surface side and the second surface side of the armature 2.

The cooling unit 10 for cooling the plurality of coils 4 of the armature 2 is interposed between the coil array on the first surface side and the coil array on the second surface side of the armature 2. The cooling unit 10 has a long substantially rectangular plate shape, and is disposed such that one end surface or an inner end surface of each coil array described above is in contact with both a first surface and a second surface thereof. The cooling unit 10 includes a flat plate cooling portion 12 having a substantially rectangular plate shape that supports each coil array on each surface (first surface and second surface), an inflow portion 14 provided at one end portion of the flat plate cooling portion 12 in the arrangement direction of the coils 4, and an outflow portion 16 provided at the other end portion of the flat plate cooling portion 12 in the arrangement direction of the coils 4.

The inflow portion 14 is provided at a position deviated from the arrangement direction of the coils 4, specifically, above the coil 4 at one end (left end in FIG. 2) of the coil array. In the present specification, terms such as "above" and "below" conveniently represent a relative positional relationship between the coil array or the coils 4 and the inflow portion 14 and the like with reference to the drawings, and do not mean above and below along the vertical or gravitational direction. Hereinafter, unless otherwise specified, terms such as "upper", "lower", "left", and "right" mean a relative direction with respect to the coil array or the coils 4 shown in each drawing. An inflow port 14*a* into which a refrigerant such as cooling water for cooling the plurality of coils 4 flows is provided in the upper portion of the inflow portion 14. As will be described later, a flow path is formed inside the flat plate cooling portion 12 to allow the refrigerant that has flowed from the inflow port 14*a* to flow from one end side to the other end side of the coil array. Similar to the inflow portion 14, the outflow portion 16 is provided at a position deviated from the arrangement direction of the coils 4, specifically, above the coil 4 at the other end (right end in FIG. 2) of the coil array. An outflow port 16*a* is provided in the upper portion of the outflow portion 16 from which the refrigerant flowing in from the inflow port 14*a* and passing through the flow path in the flat plate cooling portion 12 flows out.

As described above, the refrigerant flowing through the flow path in the flat plate cooling portion 12 simultaneously cools two coil arrays disposed so as to be in contact with both surfaces of the flat plate cooling portion 12. In addition, the coil array may be provided on only one surface of the flat plate cooling portion 12. In this case, the refrigerant flowing through the flow path in the flat plate cooling portion 12 cools one coil array disposed so as to be in contact with one surface of the flat plate cooling portion 12.

Figure 3:
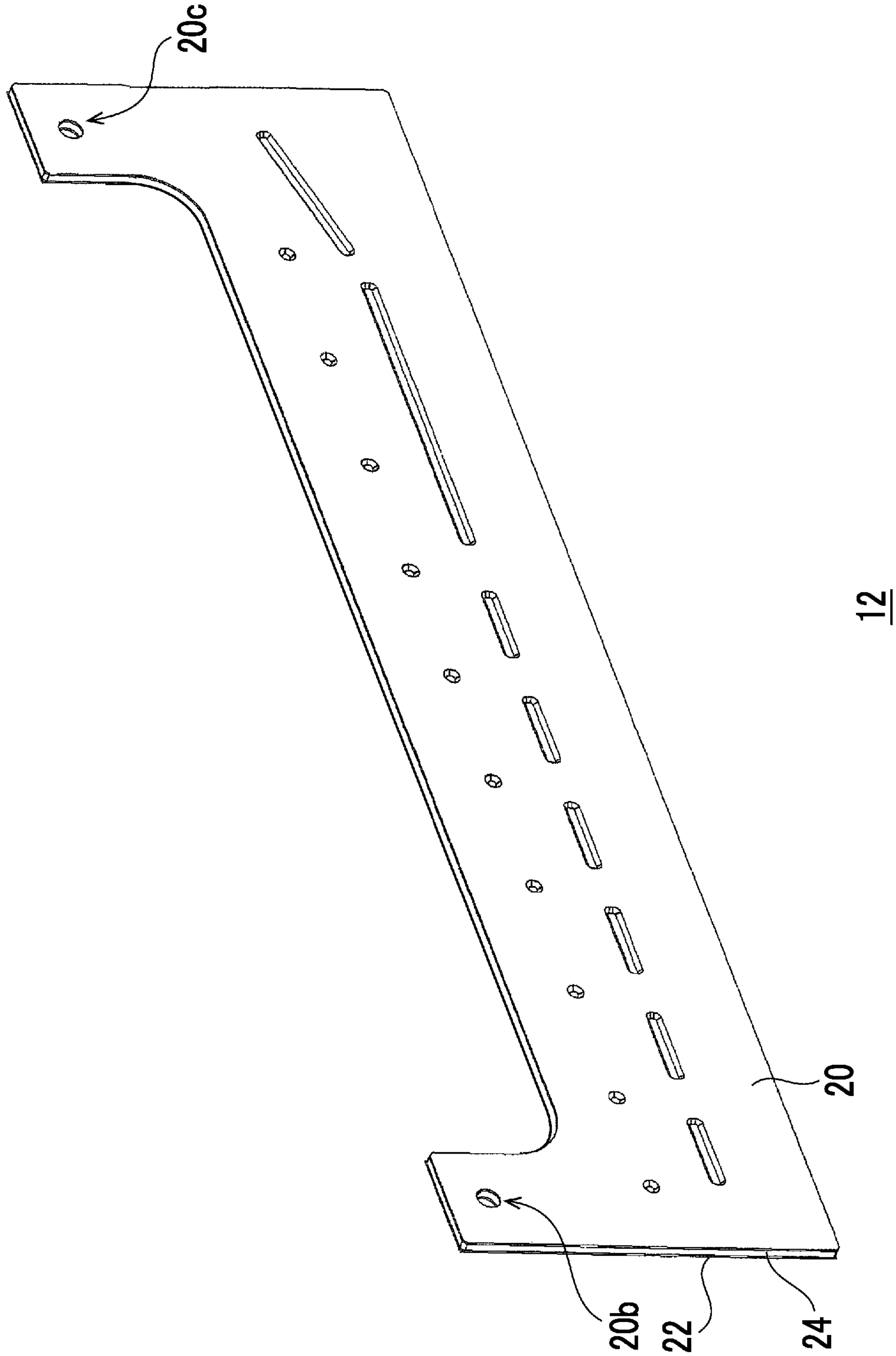
FIG. 3 is a perspective view of a flat plate cooling portion.
Figure 4:
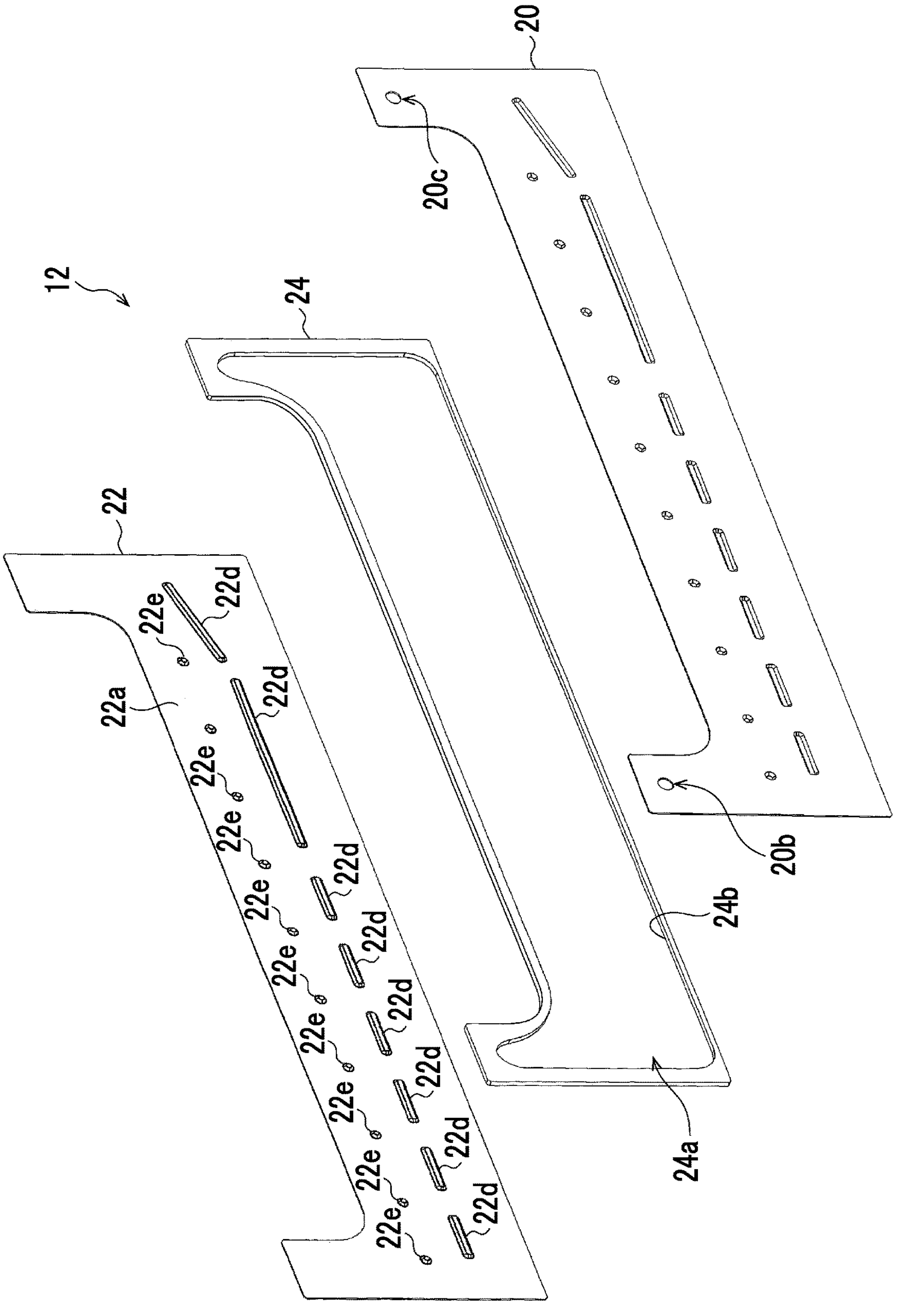
FIG. 4 is an exploded perspective view of the flat plate cooling portion.
Figure 5:
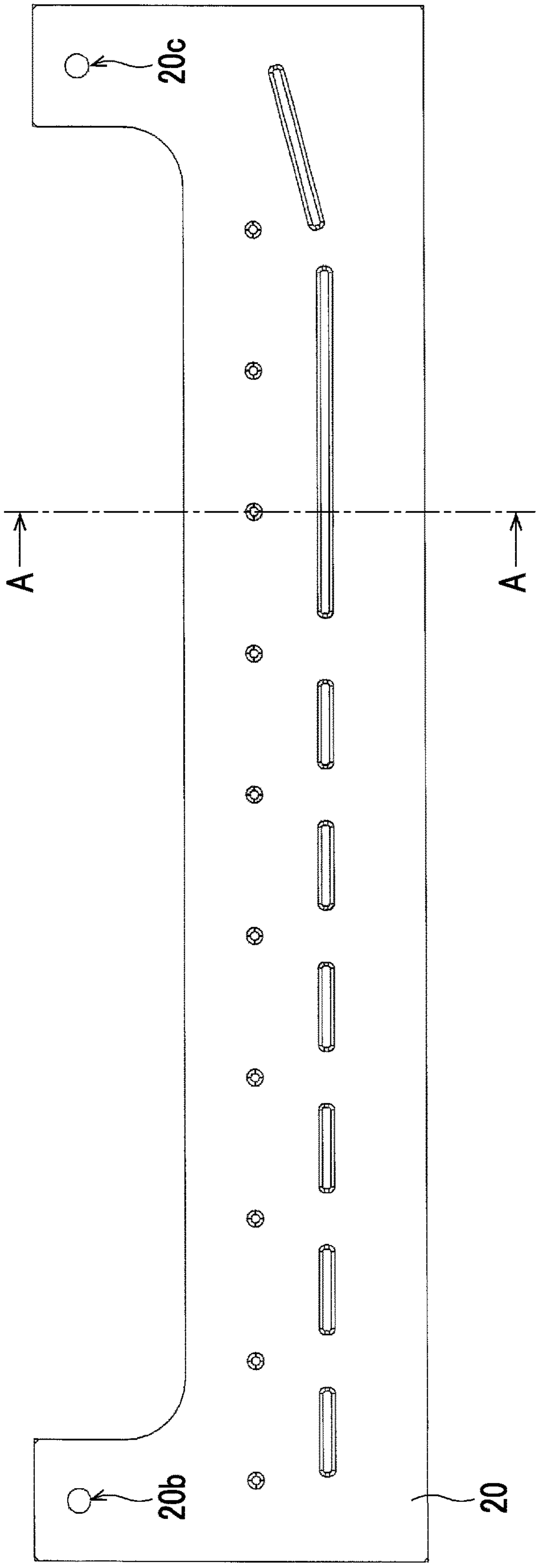
FIG. 5 is a side view of the flat plate cooling portion as viewed from a first flat plate member side.
Figure 6:
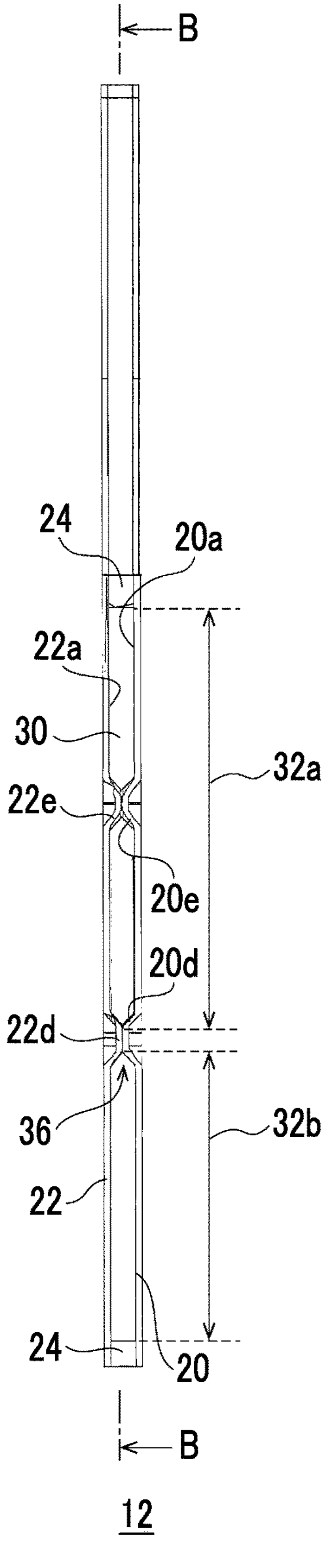
FIG. 6 is a cross-sectional view taken along line A-A of FIG. 5.

FIGS. 3 to 6 show the flat plate cooling portion 12. FIG. 3 is a perspective view of the flat plate cooling portion 12. FIG. 4 is an exploded perspective view of the flat plate cooling portion 12. FIG. 5 is a side view of the flat plate cooling portion 12 as viewed from the first flat plate member 20 side. FIG. 6 is a cross-sectional view taken along line A-A of FIG. 5. The flat plate cooling portion 12 includes a first flat plate member 20, a second flat plate member 22, and a frame member 24. The first flat plate member 20, the second flat plate member 22, and the frame member 24 are formed of a metal material such as stainless steel (SUS).

The first flat plate member 20 is a substantially rectangular flat plate. The second flat plate member 22 is a substantially rectangular flat plate having substantially the same size and shape as the first flat plate member 20. The frame member 24 is a frame-shaped member having substantially the same outer peripheral shape as the first flat plate member 20 and the second flat plate member 22. The frame member 24 can also be said to be a flat plate member having one large opening portion 24*a* defined by the frame. The first flat plate member 20, the frame member 24, and the second flat plate member 22 are stacked in this order and joined over the entire outer periphery. As shown in FIG. 4, inside the flat plate cooling portion 12, a flow path 30 (FIG. 6) defined by the inner surface 20*a* (FIG. 6) of the first flat plate member 20 facing the second flat plate member 22, the inner surface 22*a* of the second flat plate member 22 facing the first flat plate member 20, and the inner peripheral surface 24*b* of the opening portion 24*a* of the frame member 24 is formed.

As shown in FIG. 5, a substantially circular inflow port 20*b* penetrating the first flat plate member 20 in a direction perpendicular to the plane of the paper surface (direction perpendicular to both the longitudinal direction and the lateral direction of the first flat plate member 20) is formed on one end side (left end side in FIG. 5) in the longitudinal direction and one end side (upper end side in FIG. 5) in the lateral direction of the first flat plate member 20. In addition, on the other end side (right end side in FIG. 5) in the longitudinal direction and one end side in the lateral direction of the first flat plate member 20, a substantially circular outflow port 20*c* that penetrates the first flat plate member 20 in a direction perpendicular to the paper surface is formed. As shown in FIG. 4, the inflow port 20*b* and the outflow port 20*c* are located inside the opening portion 24*a* of the frame member 24 in side view. Therefore, the inflow port 20*b* and the outflow port 20*c* communicate with the flow path 30 inside the frame member 24 or the flat plate cooling portion 12. The inflow port and the outflow port may be formed in the second flat plate member 22.

As shown in FIG. 6, on the inner surface 20*a* of the first flat plate member 20, a plurality of protrusions 20*d* and 20*e* protruding toward the second flat plate member 22 side (left side in FIG. 6) inside the opening portion 24*a* (FIG. 4) are formed. Similarly, as shown in FIGS. 4 and 6, on the inner surface 22*a* of the second flat plate member 22, a plurality of protrusions 22*d* and 22*e* protruding toward the first flat plate member 20 side (right side in FIG. 6) inside the opening portion 24*a* are formed. The plurality of protrusions 20*d* and 20*e* and the plurality of protrusions 22*d* and 22*e* are formed at substantially the same location in side view and have substantially the same shape, and the respective protrusion amounts are also substantially the same. As shown in FIG. 6, the plurality of protrusions 20*d*, 20*e*, 22*d*, and 22*e* enter the opening portion 24*a* of the frame member 24, and the tips of the corresponding (opposing) protrusions are joined to each other. The plurality of protrusions 20*d*, 20*e*, 22*d*, and 22*e* are formed, for example, by drawing. In this case, recessed portions associated with drawing are formed on the back sides of the protrusions 20*d*, 20*e*, 22*d*, and 22*e*.

The plurality of linear protrusions 20*d* and 22*d* provided substantially in the center of the first flat plate member 20 and the second flat plate member 22 (or the opening portion 24*a* of the frame member 24) in the vertical direction are arranged substantially in a straight line along the longitudinal direction of the respective flat plate cooling portion 12. As shown in FIG. 6, the flow path 30 in the flat plate cooling portion 12 is divided into an upper first divided flow path 32*a* and a second divided flow path 32*b* by the linear protrusions 20*d* and 22*d*. Here, the linear protrusions 20*d* and 22*d* form a partition wall 36 that divides the flow path 30 into upper and lower divided flow paths 32*a* and 32*b*. In addition, the flow path 30 in the flat plate cooling portion 12 may be divided into three or more divided flow paths.

A plurality of point-like protrusions 20*e* and 22*e* are provided in the flow path 30 (inside the first divided flow path 32*a* in the illustrated example) at substantially constant intervals along the longitudinal direction of the flat plate cooling portion 12. By joining the protrusion 20*e* and the protrusion 22*e*, the joining intensity of the first flat plate member 20 and the second flat plate member 22 can be increased. This can prevent deformation of the first flat plate member 20 and the second flat plate member 22 due to the pressure of the refrigerant flowing in the flow path 30 between the first flat plate member 20 and the second flat plate member 22.

Figure 7:
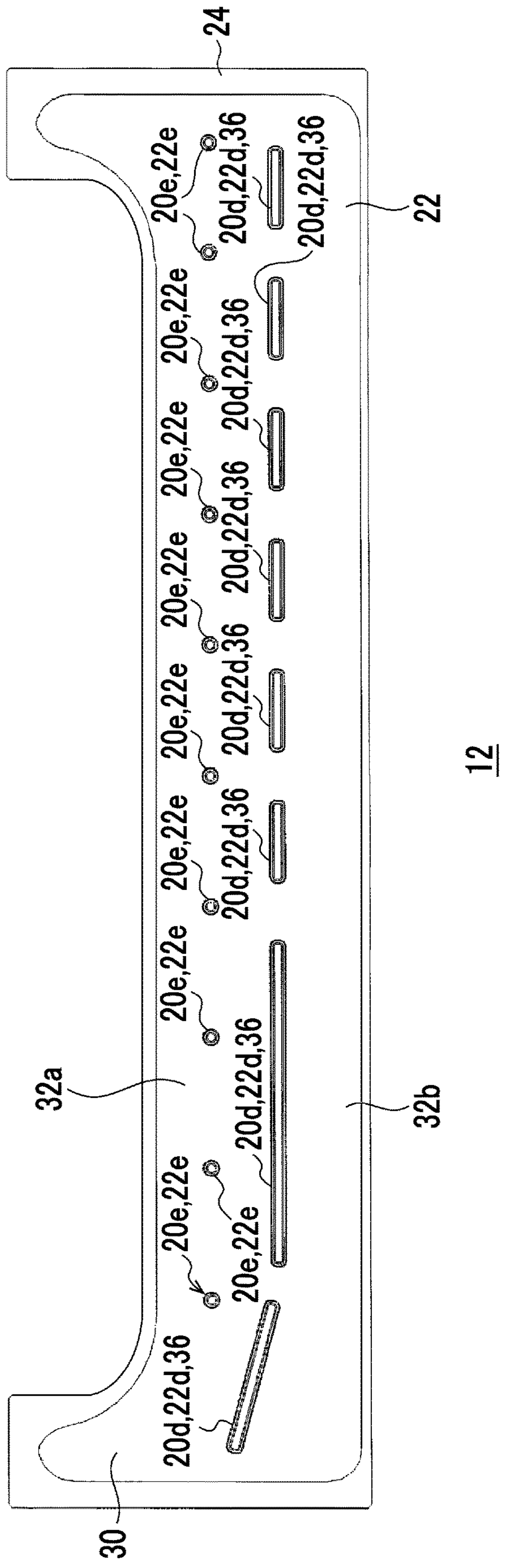
FIG. 7 is a cross-sectional view taken along line B-B of FIG. 6.

FIG. 7 is a cross-sectional view taken along the line B-B of FIG. 6, and shows a side cross section of the flow path 30 in the flat plate cooling portion 12. The plurality of protrusions 20*d*, 20*e*, 22*d*, and 22*e* are disposed in an island shape isolated from each other. Since the linear protrusions 20*d* and 22*d* forming the partition wall 36 are also disposed in an island shape or discontinuously, the partition wall 36 is formed discontinuously or intermittently along the longitudinal direction of the flat plate cooling portion 12.

The inflow port 14*a* of the inflow portion 14 in FIG. 2 communicates with the inflow port 20*b* of the first flat plate member 20. Therefore, the refrigerant that has flowed from the inflow port 14*a* flows into the flow path 30 in the flat plate cooling portion 12 through the inflow port 20*b*. Similarly, the outflow port 16*a* of the outflow portion 16 communicates with the outflow port 20*c* of the first flat plate member 20. Therefore, the refrigerant that has passed through the flow path 30 flows out from the outflow port 16*a* through the outflow port 20*c*.

Figure 8:
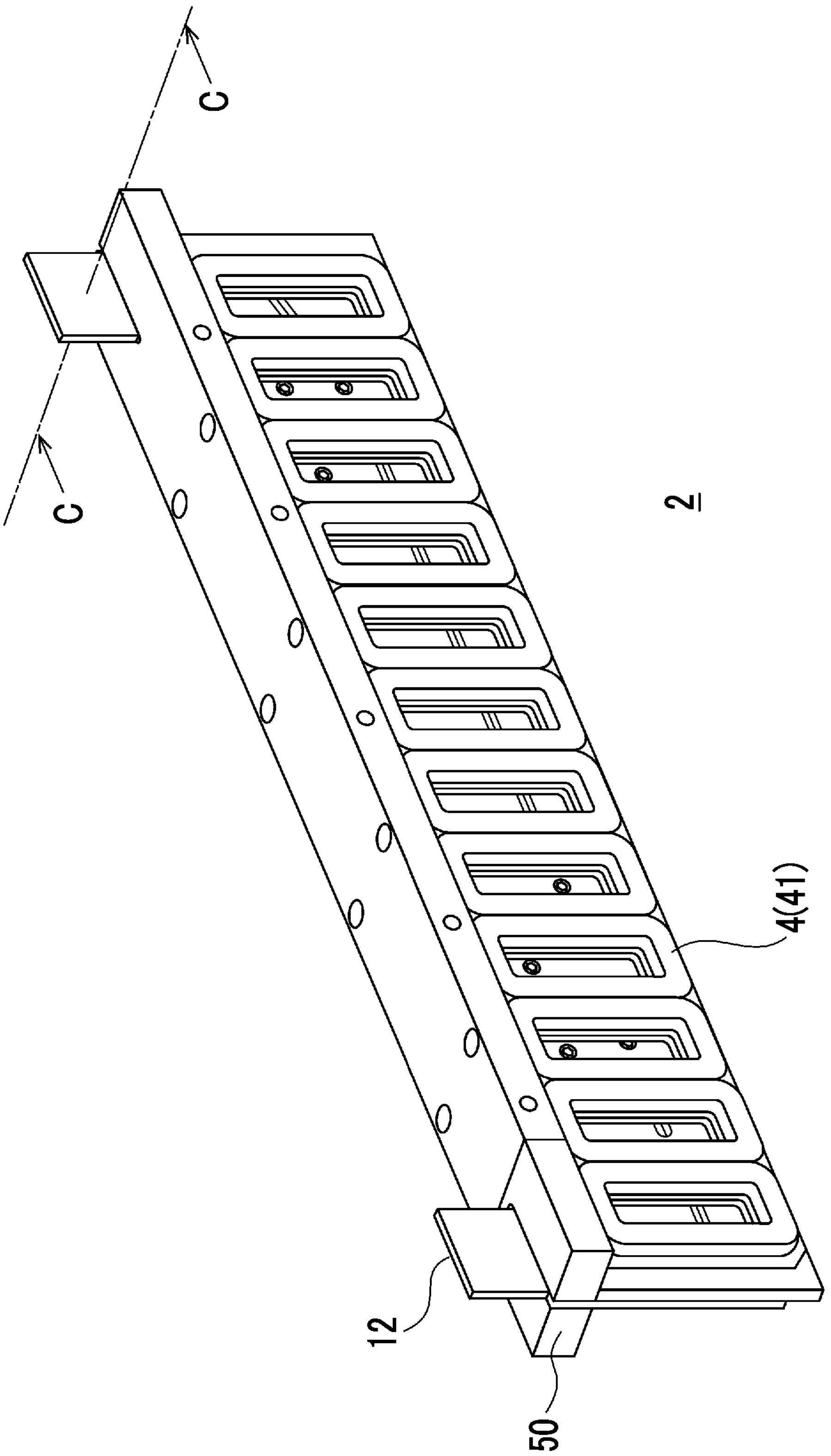
FIG. 8 is a perspective view of an armature according to first embodiment.
Figure 9:
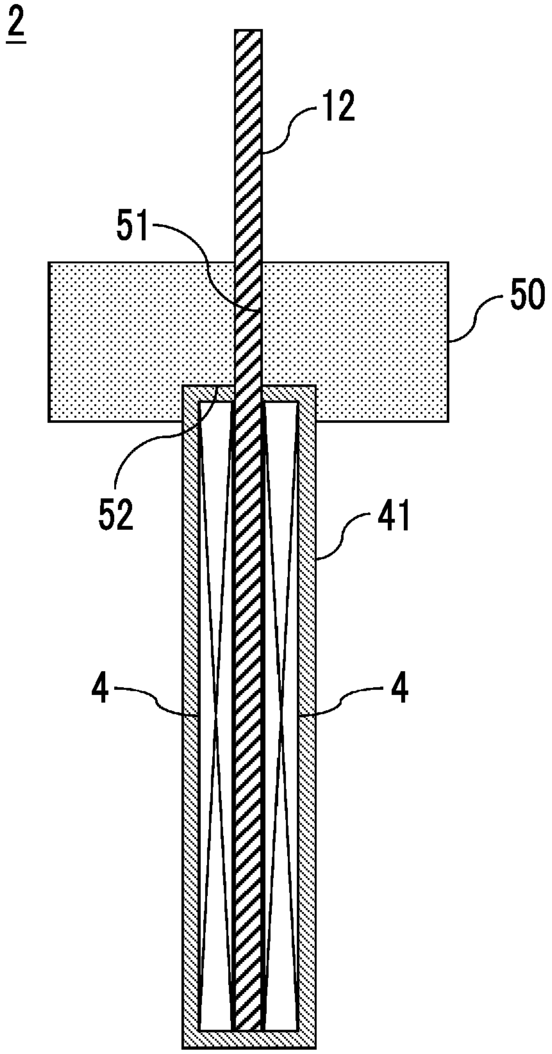
FIG. 9 is a cross-sectional view taken along line C-C of FIG. 8.

FIGS. 8 and 9 show a first embodiment in which the armature 2 or the linear motor shown in FIGS. 2 to 7 is improved for use in a vacuum environment (inside a vacuum chamber having a vacuum state inside) as shown in FIG. 1. FIG. 8 is a perspective view of an armature 2 according to a first embodiment. FIG. 9 is a cross-sectional view taken along line CC of FIG. 8. The armature 2 including the coil arrays formed on both surfaces of the flat plate cooling portion 12 is attached to a substantially rectangular parallelepiped block-shaped holder 50 made of metal such as aluminum, which has substantially the same longitudinal dimension as the armature 2. Both end portions of the flat plate cooling portion 12 are provided with upward protrusion portions corresponding to the inflow portion 14 and the outflow portion 16 in FIG. 2, and both end portions of the holder 50 are provided with a slit 51 for upward passage of the protrusion portions. Further, as schematically shown in FIG. 9, a recessed portion 52, in which an upper end portion of the coil 4 (and a coating film 41 to be described later) is fitted and held, is formed on the lower surface of the holder 50.

As shown in FIG. 9, the plurality of coils 4 forming the coil arrays on the first surface side (for example, the right side surface side) and the second surface side (for example, the left side surface side) of the armature 2 or the flat plate cooling portion 12 are covered from the outside with a coating film 41 as a covering member. The coating film 41 is formed by coating the entire end surface or outer peripheral surface of the plurality of coils 4 with an inorganic material and/or an organic material. The inorganic material and/or the organic material forming the coating film 41 is selected for the purpose of insulating the plurality of coils 4 from each other and reducing outgassing to a vacuum environment outside the coating film 41.

When a drive current such as a three-phase alternating current flows to each coil 4 to drive a field magnet (not shown) facing the outer end surfaces of each coil 4 (the right end surface of the right coil 4 and the left end surface of the left coil 4 in FIG. 9), there is a risk that a large potential difference occurs and current flows (discharges) between the front and back adjacent coils 4 sandwiching the flat plate cooling portion 12 and/or between the adjacent coils 4 in each coil array arranged in the direction perpendicular to the paper surface of FIG. 9 (longitudinal direction of the armature 2 or the flat plate cooling portion 12). In particular, in a vacuum environment, it is assumed that a discharge between adjacent coils 4 is more likely to occur than in a non-vacuum environment, and there is a possibility that the vacuum environment is contaminated due to scattering of constituent materials of the coil 4 and the flat plate cooling portion 12 due to the discharge. In order to effectively prevent such a discharge between the adjacent coils 4, the surfaces of the plurality of coils 4 are coated with the coating film 41 having insulation properties.

In addition, the coating film 41 preferably reduces outgassing to a vacuum environment. The outgas is gases such as water, oxygen, and hydrocarbons, or fine particles that can scatter in the form of a gas that are released from constituent materials of the coil 4 or the flat plate cooling portion 12 covered with the coating film 41 (including an adhesive therebetween), and causes serious pollution or contamination when released into the vacuum environment outside coating film 41. In order to reduce such outgassing to a vacuum environment, the coating film 41 can confine the gas and fine particles released by the internal coil 4 and the flat plate cooling portion 12 in the coating film 41, and it is preferable that the coating film 41 itself is made of a material that does not substantially release gases or fine particles that contaminate the vacuum environment. In addition, in the same manner that the refrigerant in the flat plate cooling portion 12 is taken out from the outflow portion 16 (FIG. 2), a gas release path for releasing gas and fine particles confined in the internal space of the coating film 41 to the outside without contaminating the vacuum environment may be provided, for example, in the flat plate cooling portion 12.

The coating film 41 having both insulation properties and an outgas reduction function as described above is made of an inorganic material such as glass or ceramics (formed by Electro Ceramic Coating (ECC), or the like) and/or an organic material such as fluororesin (polytetrafluoroethylene (PTFE) and perfluoroalkoxy fluorine resin (PFA)) or polyimide. The above inorganic materials have high insulation properties and an outgas reduction function (the amount of outgas of the inorganic materials is small), and are not easily deformed by the heat of the coil 4 or the like. In addition, the above organic materials have high insulation properties and an outgas reduction function (the amount of outgas in the organic materials is small). The coating film 41 made of these organic materials is formed by firing, curing with ultraviolet rays, or the like.

Figure 10:
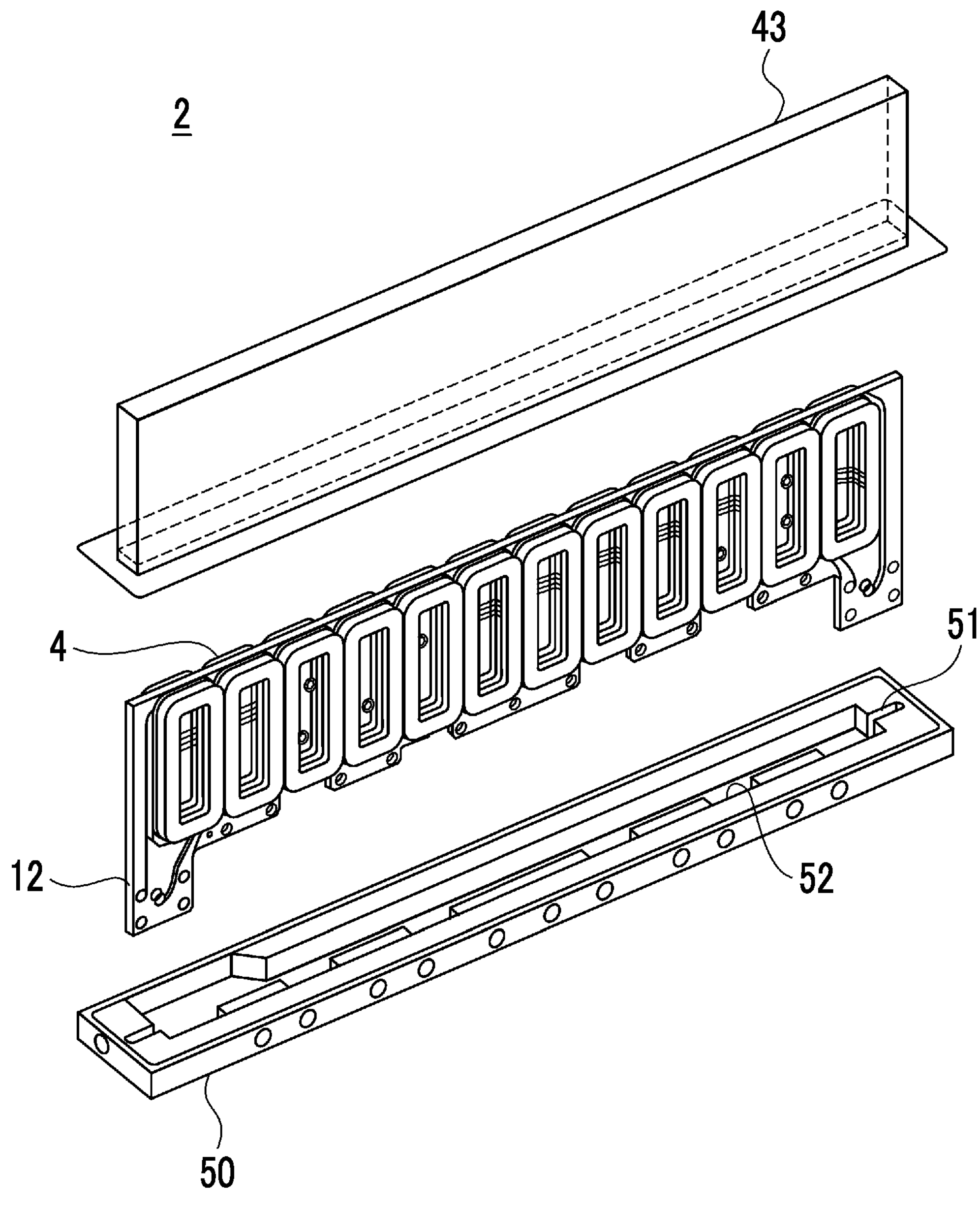
FIG. 10 is an exploded perspective view of an armature according to second embodiment.
Figure 11:
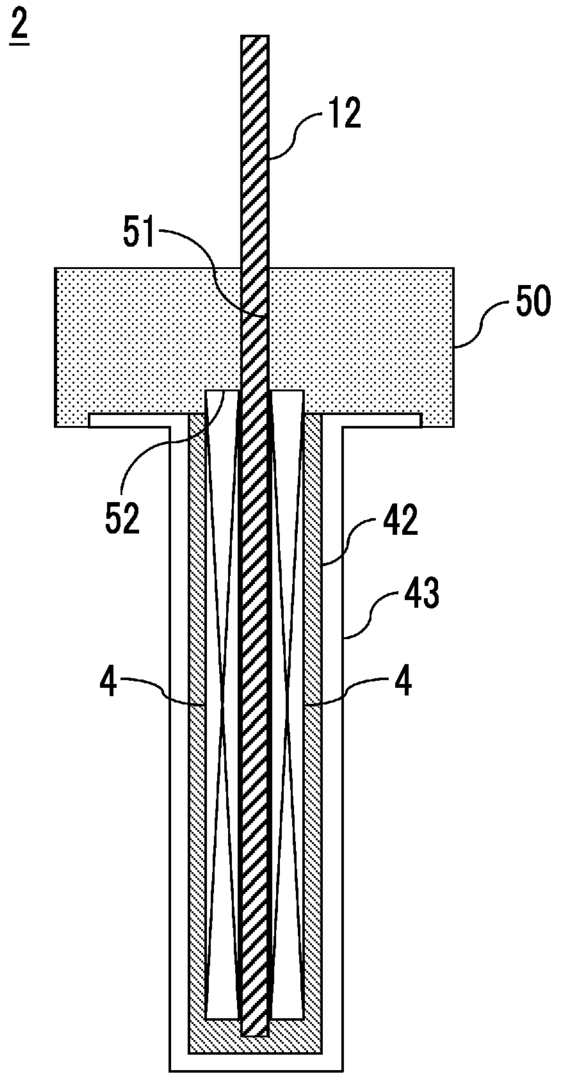
FIG. 11 is a cross-sectional view of the armature according to second embodiment.

FIGS. 10 and 11 show second embodiment in which the armature 2 or the linear motor shown in FIGS. 2 to 7 is improved for use in a vacuum environment (inside a vacuum chamber having a vacuum state inside) as shown in FIG. 1. FIG. 10 is an exploded perspective view of the armature 2 according to second embodiment. FIG. 11 is a cross-sectional view of the armature 2 according to the second embodiment, which is similar to FIG. 9. In FIG. 10, in order to show each component of the armature 2 in an easy-to-understand manner, the components are upside down with respect to FIGS. 8 and 11. The same components as those in the first embodiment of FIGS. 8 and 9 are designated by the same reference numerals, and duplicate description thereof will be omitted.

The plurality of coils 4 forming the coil arrays on the first surface side and the second surface side of the armature 2 or the flat plate cooling portion 12 are covered from the outside with an insulating member 42 (not shown in FIG. 10) as a covering member and a metal case 43 as a metal member. As shown in FIG. 11, the insulating member 42 is provided outside the plurality of coils 4 to insulate the plurality of coils 4 from each other. Specifically, the insulating member 42 is a molded product or a mold, and a space between the outer peripheral surfaces of the plurality of coils 4 and the inner peripheral surface of the metal case 43 is filled or injected with the insulating member 42. The insulating member 42 is formed of a resin material having insulation properties such as an epoxy resin. The metal case 43 is a metal member formed of a metal material such as stainless steel (SUS) that covers the insulating member 42 from the outside, and accommodates a plurality of coils 4 (and the flat plate cooling portion 12) and the insulating member 42 inside.

The armature 2 as described above is assembled, for example, by the following procedure. First, the flat plate cooling portion 12 in which coil arrays are formed on both surfaces is attached to the holder 50 such that the protrusion portions at both end portions of the flat plate cooling portion 12 in a longitudinal direction (direction perpendicular to the paper surface in FIG. 11) pass through the slits 51 and the upper end portion of each coil 4 (FIG. 11) fits into the recessed portion 52. Subsequently, the metal case 43 having an upper side (lower side in FIG. 10) opened in FIG. 11 is inserted from below so as to accommodate the plurality of coils 4 inside, and an upper end portion thereof is fixed to the lower surface of the holder 50 by welding or the like. In this state, the insulating member 42 is molded by injecting an insulating material such as an epoxy resin into a space between the outer peripheral surface of the plurality of coils 4 and the inner peripheral surface of the metal case 43 through a mold injection port (not shown).

In the first embodiment of FIGS. 8 and 9, the inorganic material and/or the organic material forming the coating film 41 of the plurality of coils 4 are selected in order to insulate the plurality of coils 4 from each other and reduce the outgassing to the vacuum environment outside the coating film 41. However, in the second embodiment, the insulating member 42 insulates the plurality of coils 4 from each other, and the metal case 43 reduces the outgassing to the vacuum environment outside. Therefore, in the second embodiment, an insulating material such as an epoxy resin suitable for ensuring the insulation properties can be adopted for the insulating member 42, and a metal material such as SUS suitable for reducing outgas can be adopted for the metal case 43.

Here, the insulating material forming the insulating member 42 can be a source of outgas, but since the metal case 43 having a high outgas reduction function covers the insulating member 42 from the outside, it is possible to effectively reduce the release of outgas into the vacuum environment. The metal member that covers the insulating member 42 from the outside is not limited to the metal case 43 shown in FIGS. 10 and 11, and a metal coating film containing a metal material such as nickel with which the surface of the insulating member 42 formed in advance by plating or the like is coated may be used. Further, a coating film of an inorganic material and/or an organic material exemplified in the first embodiment of FIGS. 8 and 9 may be formed to cover the previously formed insulating member 42 from the outside, instead of or in addition to the metal member (metal case 43 or metal coating film).

In the second embodiment as described above, since the plurality of coils 4 and the flat plate cooling portion 12 are covered with the insulating member 42, even in a case where the temperature and pressure of the refrigerant in the flat plate cooling portion 12 are significantly different from the external vacuum environment, the deformation of the flat plate cooling portion 12 can be reduced. Therefore, it is possible to increase the flow rate and/or decrease the temperature of the refrigerant flowing through the flat plate cooling portion 12, thereby improving the cooling efficiency of the cooling unit 10 and the operating efficiency of the armature 2 or the linear motor.

The present invention has been described based on the embodiments. Embodiments are examples, and it is understood by those skilled in the art that various modifications are possible for each of the components and combinations of the respective processing processes, and that such modifications are also within the scope of the present invention.

In addition, the functional configuration of each device described in the embodiment can be implemented by hardware resources or software resources, or by the cooperation between the hardware resources and the software resources. A processor, a ROM, a RAM, or other LSIs can be used as the hardware resource. Programs such as operating systems and applications can be used as software resources.

It should be understood that the invention is not limited to the above-described embodiment, but may be modified into various forms on the basis of the spirit of the invention. Additionally, the modifications are included in the scope of the invention.

What is claimed is:

1. An armature comprising:

a plurality of coils that generate power according to a flowing current;

a covering member that covers the plurality of coils from an outside, insulates the plurality of coils from each other to prevent outgas from releasing, and reduces outgas to the outside; and a cooling unit that cools the plurality of coils, wherein the cooling unit has a plate shape having a first surface and a second surface, the plurality of coils being provided on both a first surface side and a second surface side of the cooling unit, the covering member includes an insulating member formed of a resin material and a coating film formed of an inorganic material with electrical insulation properties, the insulating member covers, from the outside, the coils on the first surface side and the second surface side, and a part of the cooling unit together to insulate the plurality of coils from each other, the insulating member is configured to prevent an electrical discharge between a coil provided on the first surface side and a coil provided on the second surface side facing each other with the cooling unit interposed therebetween, and the coating film is configured to cover the outside of the insulating member to suppress release of outgas to the outside, the cooling unit includes a flow path through which a refrigerant for cooling the coils flows, and the flow path is arranged to span adjacent coils provided on the first surface side and the second surface side.

2. The armature according to claim 1, wherein the inorganic material includes at least one of glass and ceramics.

3. The armature according to claim 1, wherein the cooling unit is provided on end surfaces on one side of the plurality of coils and cools the plurality of coils, and the covering member covers end surfaces on the other side of the plurality of coils.

4. A driving device comprising:

a plurality of coils that generate power according to a flowing current;

a covering member that covers the plurality of coils from an outside, insulates the plurality of coils from each other to prevent outgas from releasing, and reduces outgas to the outside;

a cooling unit that cools the plurality of coils; and a vacuum chamber that accommodates the plurality of coils, the covering member, and the cooling unit inside the vacuum chamber in a vacuum state, wherein the cooling unit has a plate shape having a first surface and a second surface, the plurality of coils being provided on both a first surface side and a second surface side of the cooling unit, the covering member includes an insulating member formed of a resin material and a coating film formed of an inorganic material with electrical insulation properties, the insulating member covers, from the outside, the coils on the first surface side and the second surface side, and a part of the cooling unit together to insulate the plurality of coils from each other, the insulating member is configured to prevent an electrical discharge between a coil provided on the first surface side and a coil provided on the second surface side facing each other with the cooling unit interposed therebetween, and the coating film is configured to cover the outside of the insulating member to suppress release of outgas to the outside, the cooling unit includes a flow path through which a refrigerant for cooling the coils flows, and the flow path is arranged to span adjacent coils provided on the first surface side and the second surface side.

* * * * *